United States Patent
Khan et al.

[11] Patent Number: 5,914,562
[45] Date of Patent: Jun. 22, 1999

[54] ANODIC BONDED PLASMA ADDRESSED LIQUID CRYSTAL DISPLAYS

[75] Inventors: Babar Ali Khan, Ossining, N.Y.; Jacob Bruinink, Eindhoven, Netherlands; Adrianus Leonardus Josephus Burgmans, Eindhoven, Netherlands; Henri Roger Jules Richard Van Helleputte, Eindhoven, Netherlands; Petrus Franciscus Gerardus Bongaerts, Waalre, Netherlands; Karel Elbert Kuijk, Dommelen, Netherlands; Thomas Stanley Buzak; Kevin John Ilcisin, both of Beaverton, Oreg.; Paul Christopher Martin, Vancouver, Wash.

[73] Assignees: Philips Electronics North America Corporation, New York, N.Y.; Tektronix, Inc., Wilsonville, Oreg.

[21] Appl. No.: 08/384,090

[22] Filed: Feb. 6, 1995

[51] Int. Cl.$^6$ ........................................ H01J 17/49
[52] U.S. Cl. ........................................... 313/582
[58] Field of Search .......................... 313/582, 583, 313/584, 637, 643, 634, 292, 500; 65/36, 40; 345/60, 87; 156/60, 99, 109

[56] References Cited

U.S. PATENT DOCUMENTS

| | | | |
|---|---|---|---|
| 3,886,393 | 5/1975 | Hinson | 313/572 |
| 4,896,149 | 1/1990 | Buzak et al. | 340/794 |
| 5,077,553 | 12/1991 | Buzak | 340/794 |
| 5,272,472 | 12/1993 | Buzak | 345/60 |
| 5,276,384 | 1/1994 | Martin | 313/582 |
| 5,349,454 | 9/1994 | Iwama | 359/54 |
| 5,349,464 | 9/1994 | Iwama | 359/54 |
| 5,444,335 | 8/1995 | Matsumoto | 313/493 |

FOREIGN PATENT DOCUMENTS

| | | |
|---|---|---|
| 0500084 | 8/1992 | European Pat. Off. . |
| 0500085 | 8/1992 | European Pat. Off. . |
| 0554851 | 8/1993 | European Pat. Off. . |
| 0581376 | 2/1994 | European Pat. Off. . |
| 0597432 | 5/1994 | European Pat. Off. . |

OTHER PUBLICATIONS

Proceedings, IEEE Micro Electro Mechanical Systems An Investigation of Microstructures, Sensors, Actuators, Machines, and Robots, pp. 43–48, edited by W. Beaceke and H. Petzold, Feb. 4–7, 1992, in Trarcmunde, Germany.

Journal of the Electrochemical Society, vol. 138, No. 10, Oct. 1991, pp. 3089–3094.

"A 16–Inch Full Color Plasma Addressed Liquid Crystal Display", Digest of Tech. Papers 1993 SID Int. Symp., Soc. for Info. Displ. pp. 883–886.

*Primary Examiner*—Sandra O'Shea
*Attorney, Agent, or Firm*—John C. Fox

[57] ABSTRACT

A process for fabricating the channel substrate of a plasma-addressed electro-optic display device comprising a layer of electro-optic material, data electrodes coupled to the electro-optic layer and adapted to receive data voltages for activating portions of the electro-optic layer, and a plurality of plasma channels extending generally transverse to the data electrodes for selectively switching on said electro-optic portions and closed off by a thin dielectric sheet, typically a thin glass sheet. The channel substrate is fabricated using anodic bonding to attach the thin glass sheet to an etched or walled preferably glass substrate containing the channels. This reduces stresses in the thin glass sheet. Reduced stress allows post processing of the thin sheet, particularly further etching to reduce its thickness.

6 Claims, 2 Drawing Sheets

ANODIC BONDED PLASMA ADDRESSED LIQUID CRYSTAL DISPLAYS

RELATED APPLICATIONS

Commonly-assigned, copending application, Ser. No. 08/361,078, filed Dec. 21, 1994 (5604-0375).

Commonly-assigned, copending application, Ser. No. 08/407,536, filed Mar. 20, 1995 (5604-0379).

This invention relates to plasma-addressed liquid crystal display panels, and in particular to the fabrication of the channel substrate for such displays.

BACKGROUND OF INVENTION

Plasma-addressed liquid crystal display panels, commonly referred to as "PALC" display devices, comprise, typically, a sandwich of: a first substrate having deposited on it parallel transparent column electrodes, commonly referred to as "ITO" columns or electrodes since indium-tin oxides are typically used, on which is deposited a color filter layer for a color display; a second substrate comprising parallel sealed plasma channels corresponding to rows of the display crossing all of the ITO columns each of which is filled with a low pressure ionizable gas, such as helium, neon, or argon, and containing spaced cathode and anode electrodes along the channel for ionizing the gas to create a plasma, which channels are closed off by a thin transparent dielectric sheet; and an electro-optic material such as a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel in the row to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. and EP patents, and publication, the contents of which are hereby incorporated by reference: U.S. Pat. No. 4,896,149; 5,077,553; 5,272,472; 5,276,384; 5,349,454; EP 0 500 084 A2; EP 0 500 085 A2; EP 0 554 851 A1; EP 0 597 432 A1; and Buzak et al., "A 16-Inch Full Color Plasma Addressed Liquid Crystal Display", Digest of Tech. Papers, 1993 SID Int. Symp., Soc. for Info. Displ. pp. 883–886.

The second substrate, herein called the "channel substrate", is typically fabricated by etching channels in a thick first glass sheet and patterning parallel electrodes within these channels. Various ways of doing this are described in the referenced patents and publication and in the two referenced related applications. A second thin glass sheet, serving as the thin dielectric sheet to close off the channels, is then placed on top of the first glass sheet and attached to it by using a glass frit seal at the periphery. The ITO electrodes and the LC portion of the display is then fabricated on top of this structure to form the display shown in the referenced publication. The thickness of the thin glass sheet is typically about 30 to 50 $\mu$m. The frit sealing process can introduce a lot of uneven stress in this thin sheet, which makes it difficult to carry out certain processing steps on the thin sheet after the frit sealing process. For example, it would be useful to reduce the thickness of the thin sheet even further by etching it after the frit sealing process. The thinner sheet resulting will reduce the voltage required from the drive electronics and simplify the electronics. However, uneven stress in the thin sheet leads to uneven etch rates, which can differ by a factor of 5. Such different etch rates could lead to non-uniform thicknesses across the sheet, which would lead in turn to unacceptable variations in performance across the display.

SUMMARY OF INVENTION

An object of the invention is an improved PALC display device.

Another object of the invention is an improved fabrication process for the channel substrate part of a PALC display device.

A further object of the invention is a process for bonding a thin glass sheet to a glass substrate resulting in decreased stresses in the thin glass sheet in the fabrication of a PALC display device.

In accordance with a first aspect of the invention, the channel substrate of a PALC display device is fabricated using anodic bonding to attach a dielectric sheet to a substrate containing the channels, one of which at least is of glass. The sheet is bonded to the substrate not just at the periphery of the substrate as is presently the case with frit sealing but also to all the channel ridges or walls formed between the channels.

In accordance with another aspect of the invention, preferably both the sheet and the substrate are of glass and the composition of the glass sheet is chosen to be the same or similar to that of the substrate glass. By "similar" is meant that the temperature coefficients of expansion of the two materials are substantially the same, within 5% of one another. By direct glass-to-glass bonding, two similar materials are bonded together without another intermediary material like glass frit between them. Therefore, any stress due to different temperature coefficients of two dissimilar materials are substantially avoided by the direct glass-to-glass bonding process which does not need or use glass frit.

Preferably, the glass sheet is thin and has a uniform thickness of the order of 50 $\mu$m or less.

Fabricating the channel substrate of a PALC display panel in such a way significantly reduces stress in the sheet used to fabricate such panels. Reduced stress allows post processing of the sheets, particularly further etching to reduce its thickness.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
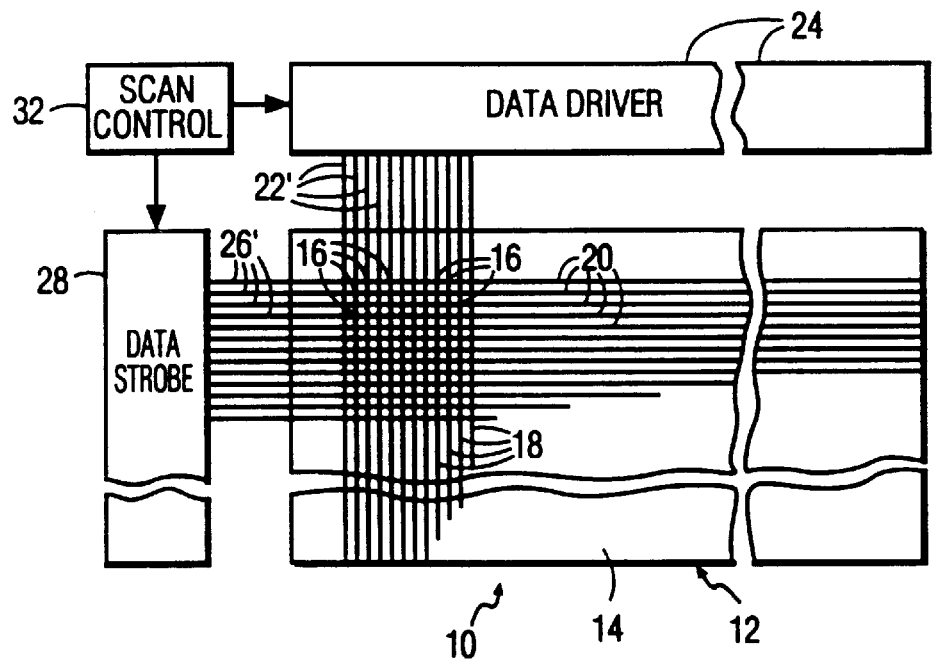
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36, the channel substrate. Skilled persons will appreciate that certain systems, such as reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential common to each channel 20 and data strobe 28 is typically applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
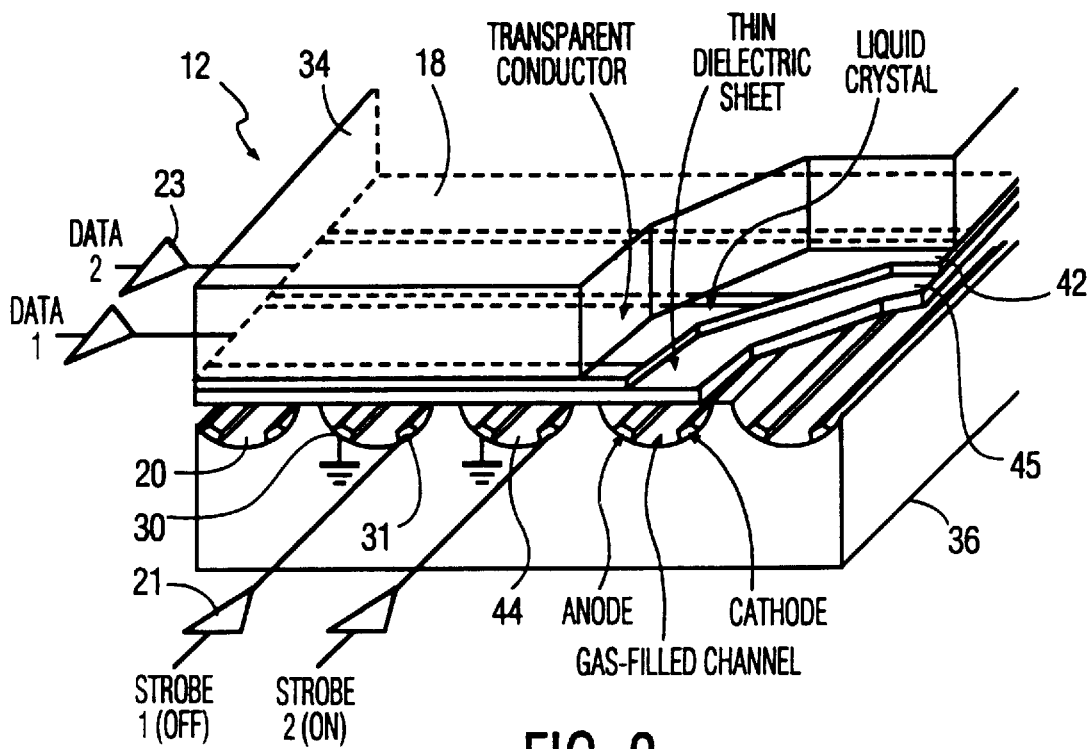
FIG. 2 is a perspective view of part of a conventional PALC display device.

FIG. 2 illustrates the PALC version of such a display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with a low-pressure, typically well below 1 Atm., ionizable gas 44, typically of helium and/or neon and optionally with a small percentage of argon, closed off with a thin dielectric sheet 45 typically of glass, and contains on an interior channel surface first and second spaced elongated electrodes 30, 31 which extend the full length of each channel. The first electrode 30 in the prior art arrangement is typically grounded and is commonly called the anode. The second electrode 31 is called the cathode, because to it will typically be supplied relative to the anode electrode a positive strobe pulse sufficient to cause electrons to be emitted from the cathode 31 to ionize the gas. As explained above, each channel 20, in turn, has its gas ionized with a strobe pulse to form a plasma and a reference potential connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

In accordance with the invention, the channel substrate is made by anodic bonding, specifically to attach a thin sheet 45, preferably of glass, to the etched substrate 36 containing the channels 20, preferably also of glass, preferably everywhere the thin flat glass sheet comes into contact with the bottom substrate including the ridges 62 formed between the channels 20 by the etching process and which lie in same plane.

Figure 3:
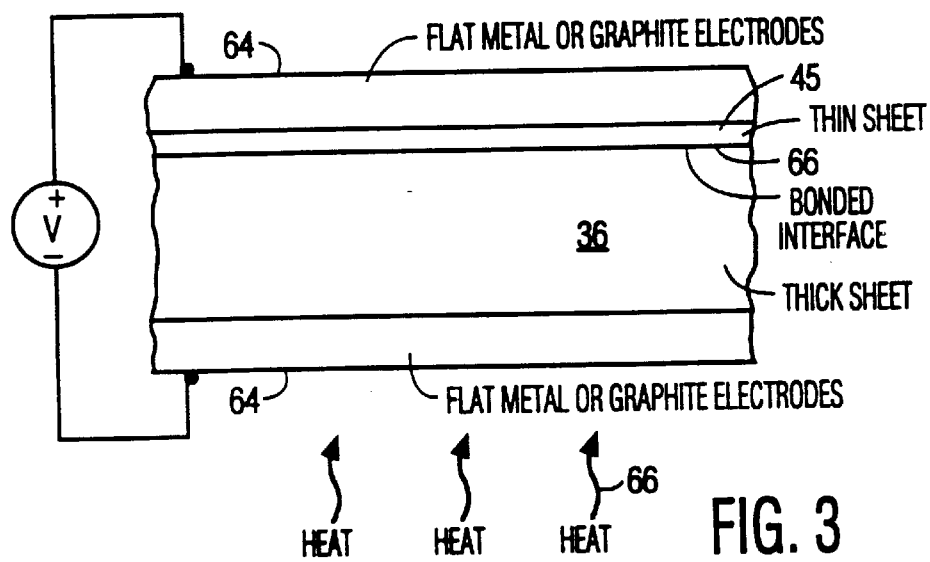
FIG. 3 schematically illustrates one form of anodic bonding process of the channel substrate in accordance with the invention.

Anodic bonding is a well known process which can be used to form a permanent bond between two plates, one-of which is typically of glass. See, for example, Proceedings, IEEE Micro Electro Mechanical Systems, An Investigation of Microstructures, Sensors, Actuators, Machines, and Robots, Pgs. 43–48, edited by W. Beaceke and H. Petzold, Feb. 4–7 1992, in Trarcmunde, Germany; and Journal Of The Electrochemical Society, Vol. 138, No. 10, October 1991, pgs. 3089–3094, which are incorporated herein by reference and which describe in detail the anodic bonding process as it can be employed in the present invention. In this process, as illustrated in FIG. 3 as applied in the present invention, the flat surfaces of the two glass plates 36 and 45 are brought together and an electric field is applied across the two sheets via flat metal or graphite electrodes 64, while simultaneously applying heat 66 to the assembly. The heating temperature is typically much less than the softening point of the glass, usually between 40–70% of the softening point. During the heating cycle, ions within the glass sheets drift to their interface 66 under the force of the electric field and the resulting force at the interface 66 pulls the two sheets together. As a consequence of this force and the temperature, a permanent chemical bond is formed directly between the glass sheets 36, 45 without an intermediary material.

In earlier applications by one of us (Ser. No. 922707, filed Jul. 28, 1992; and Ser. No. 08/177089, filed Dec. 30, 1993), the use of both anodic and fusion bonding to form high-pressure gas discharge or fluorescent lamps is described. The methods there described are applied to planar substrates enclosing small cavities. A PALC display as such is not mentioned, nor is there present a description of bonding thin glass sheets of the order of 50 μm or less to spaced ridges separating plural strip-electrode-containing channels filled with a low pressure ionizable gas as is typically employed in PALC displays. It will also be appreciated that the plasma in the ignited channel of a PALC device is not intended to generate light for illumination purposes but rather to establish a reference potential at the surface of the bonded glass sheet. However, it should also be noted that the same anodic bonding process described in the referenced patent applications can also be used in the present invention to bond the thin glass sheet to the channel substrate, ad thus the contents of both applications are herein incorporated by reference.

Figure 4:
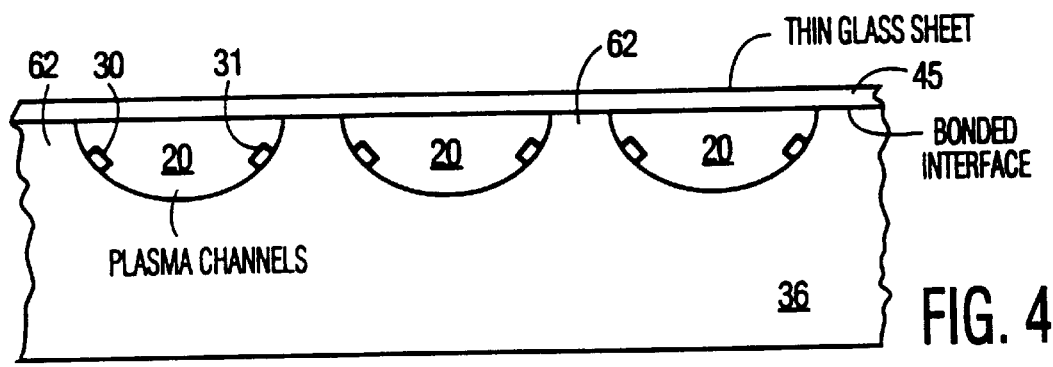
FIG. 4 is side view of part of channel substrate made by one form of the anodic bonding process according to the invention.
Figure 5:
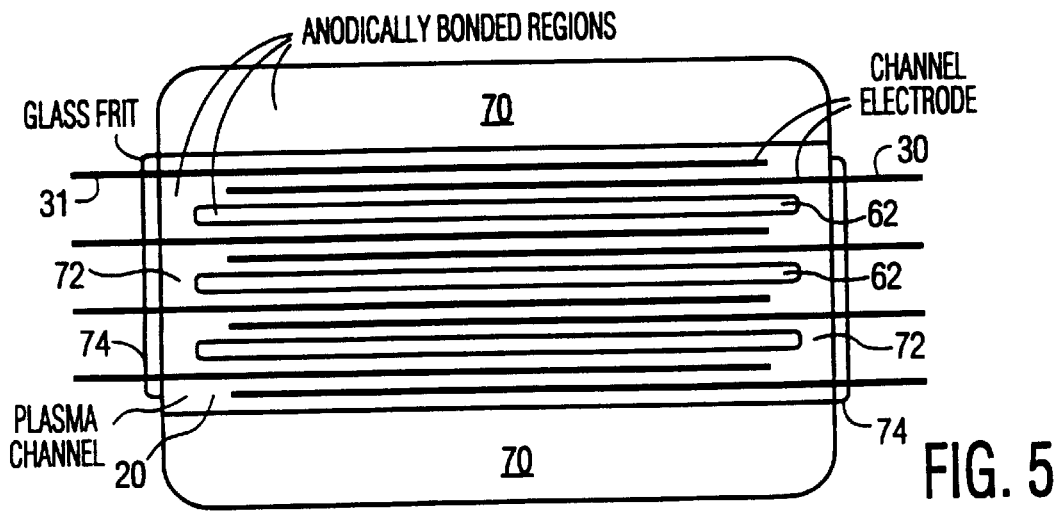
FIG. 5 is a top view of the anodic-bonded channel substrate of FIG. 4.

FIG. 4 illustrates the end product following the anodic bonding step. The thin glass sheet 45 has chemically bonded to the channel substrate 36 at all the places where the two interfaced, including the tops of the ridges 62 and the end regions 70, 72 to seal off the channels 20 at those areas. What is left unsealed are the sides for subsequent back-filling with the ionizable gas. Following the anodic bonding step to first attach the thin glass sheet to the channel substrate, glass frit 74 is used to finally seal off the assembly. Since the thin glass sheet is bonded directly to the substrate, it will not be significantly stressed. Moreover, since it is bonded to the substrate not only at the edges, but also in between the channel regions, the glass frit seal at the end will not introduce significant stress to the glass sheet in the active area overlying the channels 20. Therefore, the stress in the thin glass sheet over most of the active region will be low and uniform. This will allow further processing of the thin glass sheet to be carried out. For example, the structure can now be masked using photoresist, plastic lamination or other methods and the active area etched in a conventional etchant to reduce the thickness of the glass sheet even further. Further, since the thin glass sheet 45 is bonded to the substrate 36, it will also be easy to handle.

It will be appreciated that the drawing figures are not to scale and in particular the channel widths have been exaggerated to show the electrodes.

The process of the invention can be used not only on substrates with etched channels as described but also on the type of PALC displays in which the channels are formed by providing barrier ribs on a flat glass plate and then placing the thin glass sheet on top of those ribs as described in the referenced EP patents.

Moreover, the process of the invention is not limited to anodic bonding of flat glass sheets to channelled substrates, but is also applicable to configurations of the type described and illustrated in the referenced copending related application (5604-0379) in which both the top and bottom members are etched to form channels, and the two are then joined at their contacting ridges. A proper anodic bond is best achieved when the contacting ridge surfaces are flat.

Moreover, the invention is not limited to structures in which both members are of glass. Anodic bonding requires in at least one of the bonding elements mobile ions when an electric field is applied while the bonding elements are heated at a temperature below their softening points. This property is present in glass and thus glass should be at least one of the bonding elements. However, the other element to be bonded can be of any substantially optically transparent composition that will anodically bond to glass. Examples are quartz and ceramics such as alumina.

Still further, while the channels in the substrate are typically straight, the invention is not limited to such a configuration and other channel shapes, such as a meandering shape, are also possible within the scope of the invention.

It will also be appreciated that the invention is not limited to the specific glasses mentioned above but can be applied generally to channel substrates made with other glasses as anodic bonding is generally applicable to all kinds of glasses.

The invention can be used in all kinds of PALC displays for use in computer monitors, workstations or TV applications.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A plasma-addressed display device comprising a layer of electro-optic material, data electrodes coupled to the electro-optic layer and adapted to receive data voltages for activating portions of the electro-optic layer, a plurality of spaced elongated plasma channels containing an ionizable gas and electrodes and extending generally transverse to the data electrodes for selectively switching on said electro-optic portions, said plasma channels being formed between walls in a substrate, and a thin sheet attached to the said substrate to cover the channels, characterized in that the thin sheet is anodically bonded to the substrate.

2. A plasma-addressed display device comprising a layer of electro-optic material, data electrodes coupled to the electro-optic layer and adapted to receive data voltages for activating portions of the electro-optic layer, a plurality of spaced elongated plasma channels containing an ionizable gas and electrodes and extending generally transverse to the data electrodes for selectively switching on said electro-optic portions, said plasma channels being formed between walls in a glass substrate, and a thin glass sheet attached to the said glass substrate to cover the channels, characterized in that the thin glass sheet is anodically bonded to the glass substrate and is substantially free of stress.

3. A plasma-addressed display device as claimed in claim 2, characterized in that the thin glass sheet is also anodically bonded to the top surfaces of the walls between the channels.

4. A plasma-addressed display device as claimed in claim 2, characterized in that the ionizable gas is at a low pressure below 1 Atm.

5. A plasma-addressed display device as claimed in claim 2, characterized in that the ionizable gas comprises helium, neon, or argon.

6. A plasma-addressed display device as claimed in claim 2, characterized in that the thin glass sheet has a thickness of the order of 50 μm or less.

* * * * *